(12) United States Patent    (10) Patent No.:     US 9,062,801 B2
    Billarant et al.          (45) Date of Patent:    Jun. 23, 2015

(54) ATTACHMENT COLLAR FOR ELONGATE ELEMENTS

(71) Applicants: Fabrice Billarant, Reze (FR); Aurélie Chevalier, Champtoceaux (FR)

(72) Inventors: Fabrice Billarant, Reze (FR); Aurélie Chevalier, Champtoceaux (FR)

(73) Assignee: APLIX, Paris (FR)

( * ) Notice: Subject to any disclaimer, the term of this patent is extended or adjusted under 35 U.S.C. 154(b) by 0 days.

(21) Appl. No.: 14/346,404

(22) PCT Filed: Sep. 20, 2012

(86) PCT No.: PCT/FR2012/052099
 § 371 (c)(1),
 (2) Date: Mar. 21, 2014

(87) PCT Pub. No.: WO2013/041809
 PCT Pub. Date: Mar. 28, 2013

(65) Prior Publication Data
 US 2014/0231599 A1     Aug. 21, 2014

(30) Foreign Application Priority Data
 Sep. 22, 2011  (FR) ..................... 11 58447

(51) Int. Cl.
 *F16L 3/22*     (2006.01)
 *F16L 3/233*    (2006.01)
 *F16L 3/123*    (2006.01)

(52) U.S. Cl.
 CPC .............. *F16L 3/233* (2013.01); *F16L 3/1236* (2013.01)

(58) Field of Classification Search
 CPC ........ F16L 3/2235; F16L 3/227; F16L 3/1236
 USPC .......... 248/60, 62, 68.1, 69, 71, 73; 24/16 R, 24/16 PB; 174/164
 See application file for complete search history.

(56) References Cited

U.S. PATENT DOCUMENTS

| 2,373,833 | A | * | 4/1945 | Johnson ....................... 248/74.3 |
| 3,429,985 | A |   | 2/1969 | Czigler |
| 4,854,015 | A | * | 8/1989 | Shaull ............................ 24/16 R |
| 7,661,634 | B2 | * | 2/2010 | Thompson ................... 248/74.3 |
| 2014/0027584 | A1 | * | 1/2014 | Pauchet et al. ............... 248/68.1 |

OTHER PUBLICATIONS

International Search Report for corresponding International Application No. PCT/FR2012/052099 with English translation mailed on Jan. 17, 2013 (5 pages).
International Search Report for corresponding International Application No. PCT/FR2012/052099 and Written Opinion mailed on Jan. 17, 2013 (10 pages).

* cited by examiner

*Primary Examiner* — Gwendolyn W Baxter
(74) *Attorney, Agent, or Firm* — Bookoff McAndrews, PLLC

(57) ABSTRACT

The present invention relates to an attachment collar for elongate elements, the collar comprising a belt portion suitable for being fastened on a support, the belt portion being open and defining an inside space suitable for receiving the elongate element. In order to close the belt portion and thus retain the elongate elements in the inside space, the collar firstly an array of gripping elements made of plastics material injected integrally with the belt portion and situated on its outside face, and secondly a tape secured to the belt portion via one of its ends, the inside face of the tape presenting retention means suitable for co-operating with the gripping elements of the belt portion in order to secure the tape and the belt portion together, the belt portion presenting stiffness that is greater than the stiffness of the tape.

13 Claims, 4 Drawing Sheets

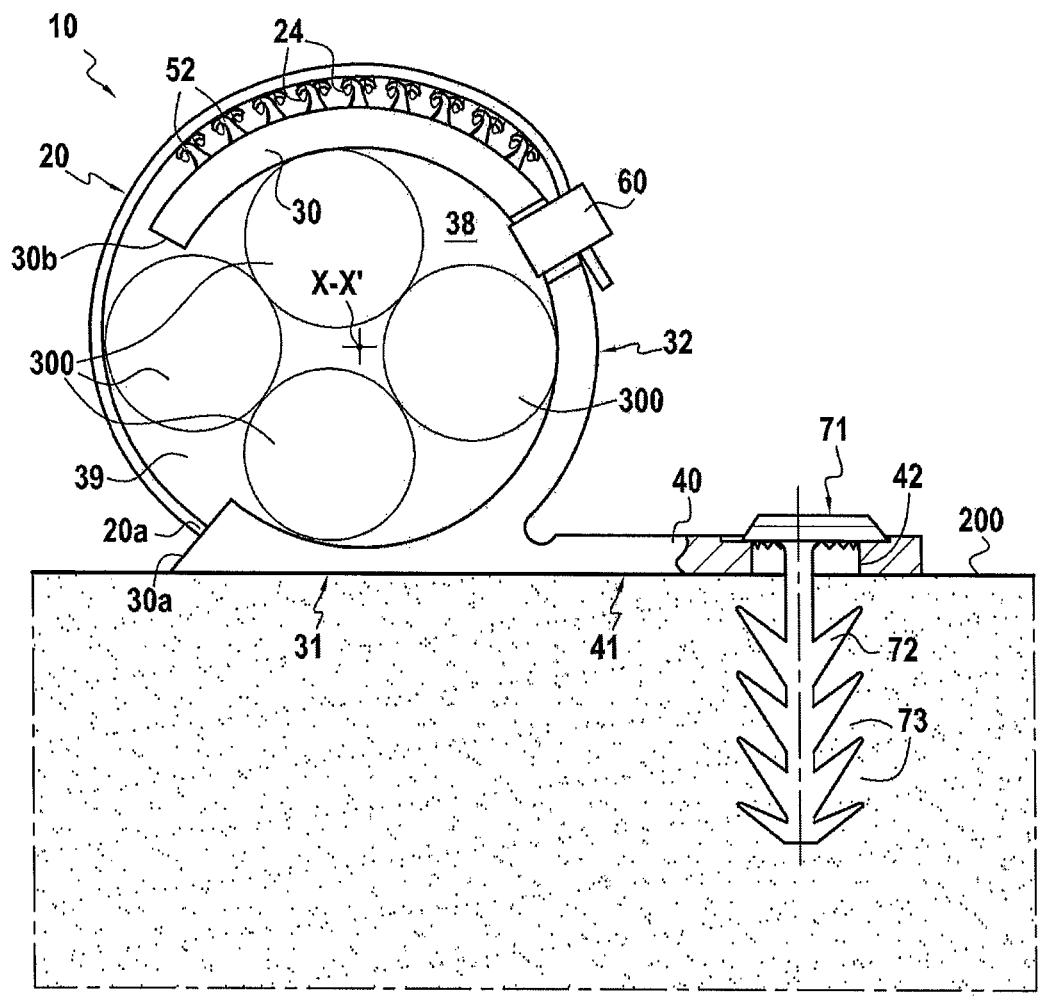
FIG.7
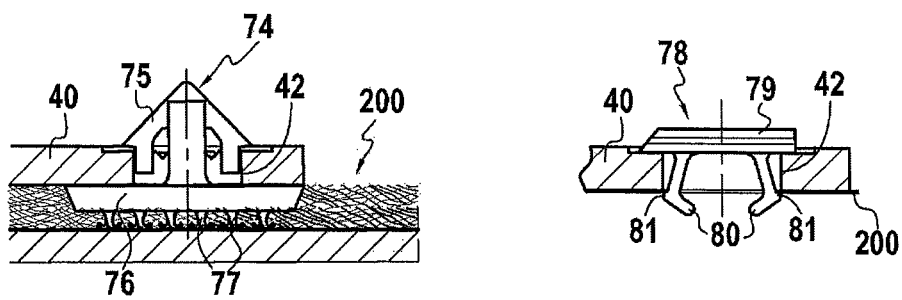
FIG.8
FIG.9

ATTACHMENT COLLAR FOR ELONGATE ELEMENTS

CROSS-REFERENCE TO RELATED APPLICATIONS

This application is a National Stage filing under 35 U.S.C. §371 of International Application No. PCT/FR2012/052099, filed Sep. 20, 2012, which claims priority to French Patent Application No. FR1158447, filed Sep. 22, 2011, the contents of each of which are incorporated by reference herein.

The present invention relates to an attachment collar for elongate elements, the collar being of the type comprising a belt portion suitable for being fastened to a support, the belt portion being open and defining an inside space suitable for receiving the elongate element, the collar further comprising means for closing the belt portion so as to retain the elongate elements in the inside space.

The collar of the present invention is particularly adapted to attaching cables or pipes. It may be used in all industrial sectors, in particular in aviation for guiding the passage of cables along cabin walls.

An already-known attachment collar 100, as shown in FIG. 1, is for attaching bundles of cables 300 to a support 200. The collar 100 comprises a belt portion 130 made of thermoplastic material, forming an open inside space 138 for receiving the cables 300. In order to prevent the cables 300 from escaping from the inside space 138, a cable tie 150 is inserted in slots 160 formed at each of the free ends 130a, 130b of the belt portion 130. A fastener tab 140 that is secured to the belt portion 130 is adapted to co-operate with a screw 170 for fastening the attachment collar 100 to the support 200.

That type of collar presents numerous drawbacks. Such collars are awkward to use because the operator needs to insert the cable tie 150 into the slots 160 that are small in size and that are formed at the free ends 130a, 130b of the belt portion 130. Thereafter, in particular during maintenance operations, the operator usually needs to use pliers and carefully manipulate the closure zone of the cable tie in order to reopen the belt portion 130 and extract the cables 300 therefrom. There is a major risk that in so doing at least one cable will be damaged or cut through.

Another example of an attachment collar of the above-specified type is disclosed in document U.S. Pat. No. 3,429,985. That collar has the drawback of the elements not being retained therein in reliable manner, and also the drawback that closing the collar depends on there being elements present in the inside space of the belt portion and on the diameter of such elements.

One of the objects of the present invention is to provide an attachment collar for elongate elements that makes it possible to remedy that above-mentioned drawbacks of the prior art.

In particular, the present invention seeks to provide an attachment collar that can be closed and reopened easily and safely in such a manner that the elongate elements retained by the collar do not run the risk of being damaged, in particular during maintenance operations.

This object is achieved by an attachment collar of the above-specified type, in which the means for closing the belt portion comprise firstly an array of gripping elements made of plastics material injected integrally with the belt portion and situated on its outside face, and secondly a tape secured to the belt portion via one of its ends, the inside face of the tape presenting retention means suitable for co-operating with the gripping elements of the belt portion in order to secure the tape and the belt portion together, the belt portion presenting stiffness that is greater than the stiffness of the tape.

The attachment collar of the invention is closed by a self-gripping system that enables the collar to be opened and closed easily and repeatedly merely by pressing the tape down onto the belt portion.

The collar can be opened manually without requiring the use of sharp tools, and there is no risk of damaging the elongate elements received in the inside space of the belt portion.

Furthermore, closure is achieved very easily. In order to release the elements arranged inside the inside space of the belt portion, it is necessary to deliberately peel off the tape such that unwanted opening is prevented.

Finally, the tape and the belt portion are fastened together by co-operation between the gripping elements and the retention means, independently of whether any elements are or are not present in the inside space of the belt portion and independently of the diameter(s) of such elements.

The gripping elements may be in the form of hooks, of mushrooms, of barbs, or of any other shape adapted to co-operate with the counterpart formed on the tape by the retention means, this counterpart possibly itself comprising retention elements such as loops, hooks, etc.

The gripping elements on the belt portion and the counterparts formed by the retention elements provide closure that may equally well be male-male or male-female.

In the invention, the gripping elements are injection molded together with the belt portion. They are thus integral with the belt portion. In the present application, "integral" should be understood to mean that they form a single piece, i.e. that there is no interface or discontinuity between them, even at microscopic level.

Furthermore, in the invention the belt portion is a rigid part. In particular, in the absence of any support means or external support, it has the ability to conserve its shape defining an open inside space.

In a preferred embodiment of the invention, the belt portion is overmolded onto the tape. In other words, the belt portion is injection molded and bonded with the tape in a single step. During injection molding, anchor points generally hold the tape so that it does not move and so that it is guaranteed that it is held captive within the thickness of the plastics material.

In an embodiment, the tape is secured to a free end of the belt portion and the gripping element array covers a portion of the outside face of the belt portion situated beside its other free end.

In an embodiment, the tape is made out of fibers.

By way of example, the tape may be made of woven fabric and may include an array of loops forming retention means.

The tape may also be made of non-woven fabric.

The tape may also be made of thermoplastic material. It may thus be constituted by a fine strip of thermoplastic material carrying hooks, mushrooms, or barbs, or other gripping elements complementary to the gripping elements of the belt portion.

The tape may be made in particular out of the same material as the belt portion. For example, it may be made of a plastics material injection molded integrally with the belt portion.

In an embodiment, the gripping elements are hooks.

In an embodiment, the belt portion presents a section that is generally curved.

In an embodiment, the belt portion presents an inside profile in the form of a circular arc having an axis.

In an embodiment, the gripping element array extends over an angular sector of at least 45°.

In an embodiment, a safety clip extends from a first edge of the belt portion, and said clip is configured so that its free end is suitable for being displaced towards the opposite edge of the belt portion. In the pressed-down position, the safety clip covers the belt portion, preferably over its entire width. In order to be held in position, the free end of the safety clip may be fastened, and in particular clip-fastened, to the opposite edge of the belt portion.

In an example, the safety clip, when in the pressed-down position, clamps the tape against the belt portion. Under such circumstances, the safety clip may include a plurality of projecting portions in relief on its face directed towards the belt portion. These projecting portions in relief provide local pressure points against the belt portion to enhance retention of the tape against the belt portion.

In another example, clearance is conserved between the tape and the safety clip in its pressed-down position. Under such circumstances, the safety clip prevents the free end of the tape from moving radially away from the belt portion, and thus prevents the attachment collar being opened inadvertently.

In an embodiment, a fastener tab suitable for co-operating with a fastener element, in particular a screw, extends from the belt portion, substantially tangentially relative thereto.

Various embodiments are described in the present description. Nevertheless, unless specified to the contrary, the characteristics described with reference to any particular embodiment may be applied to other embodiments.

The invention can be well understood and its advantages appear better on reading the following detailed description of embodiments shown as non-limiting examples. The description refers to the accompanying drawings, in which:

FIGS. 7 to 9 show other means for fastening the attachment collar of the invention to a support.

FIG. 2 shows an attachment collar 10 constituting an embodiment of the present invention.

Figure 1:
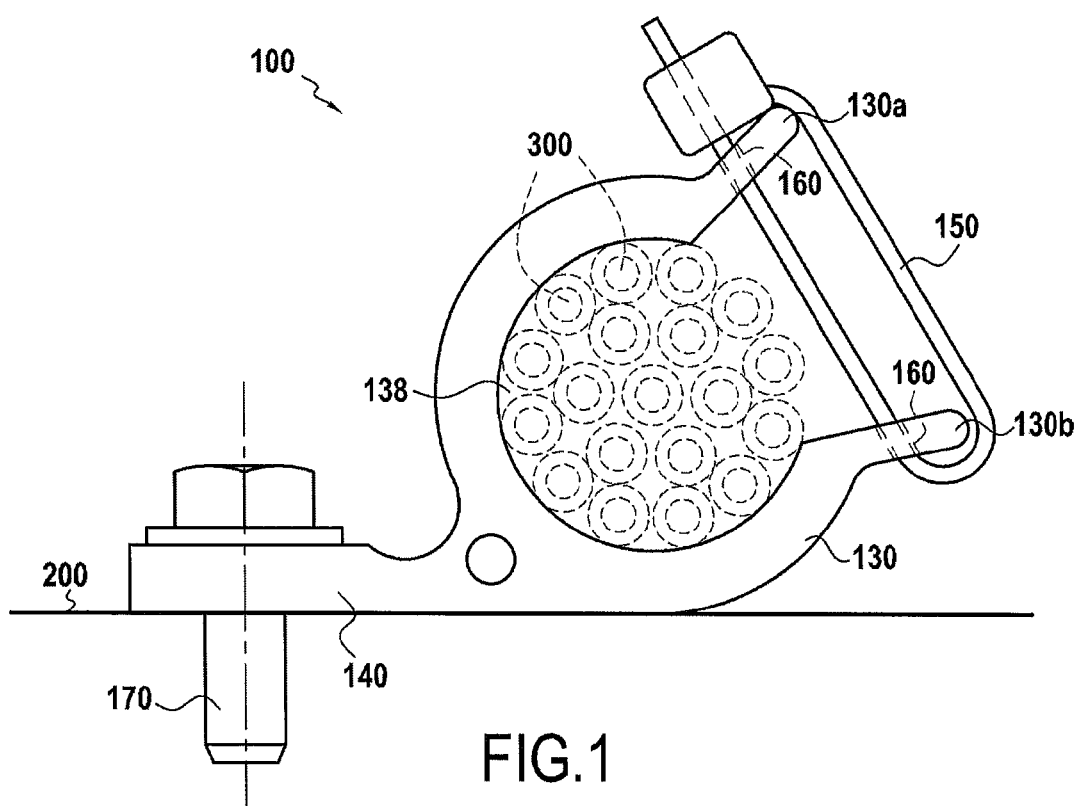
FIG. 1 shows a known attachment collar of the prior art.

The attachment collar 10 comprises a belt portion 30, which is C-shaped in this example, defining an open inside space 38 for receiving elongate elements 300 that are to be attached (see FIG. 3), and including, on its outside face 32, an array 50 of gripping elements 52.

The collar 10 also has a tape 20 secured to a first free end 30a of the belt portion 30, its inside face 22 presenting retention elements 24 suitable for co-operating with the gripping elements 52 of the belt portion 30.

By folding the tape 20 towards the second free end 30b of the belt portion 30 and pressing its retention elements 24 down to co-operate with the gripping elements 52, the belt portion 30 is closed and the elongate elements 300 are retained in the inside space 38.

The belt portion 30 is made by injection molding a thermoplastic material, in particular polyethylene, polypropylene, polyamide, poly-ether-ether-ketone (PEEK), polymethyl methacrylate (PMMA), polycarbonate (PC), or polyester.

The material constituting the belt and the thickness e of that material are selected so as to confer a certain amount of stiffness thereto.

Figure 6:
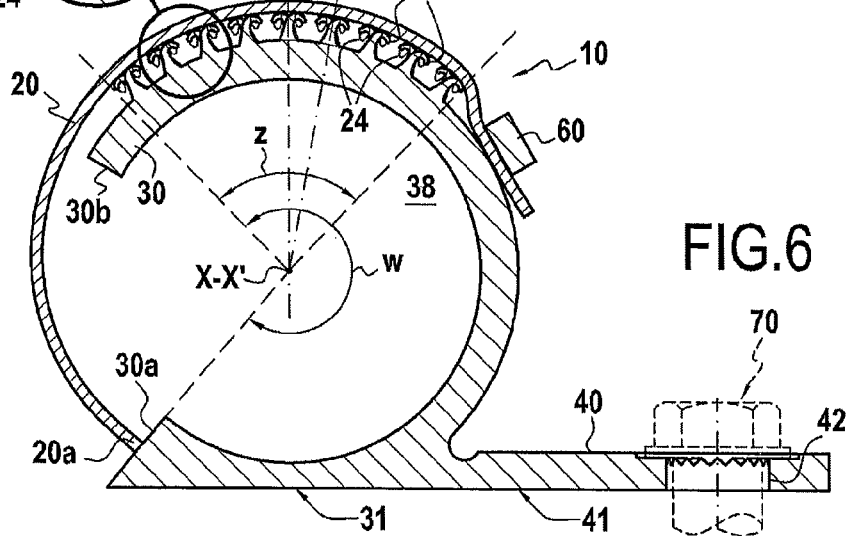
FIG. 6 is a view of the FIG. 4 collar shown in radial section on VI-VI of FIG. 5.

As shown in FIG. 6, the belt portion 30 extends over a reentrant angular sector of angle w that generally lies in the range 220° to 300°. Thus, its two free ends 30a, 30b remain angularly spaced apart from each other even when it is closed in the above-described manner by means of the tape 20.

In this example, the belt portion 30 presents an inside profile in the form of a circular arc of axis X-X'. Unless specified to the contrary, throughout the description below, a direction is said to be "radial" when it is perpendicular to the axis X-X' and intersects the axis X-X', and a direction is said to be "axial" when it is a direction parallel to the axis X-X'. More generally, a radial direction is defined as being perpendicular to a tangent to the belt portion.

Figure 2:
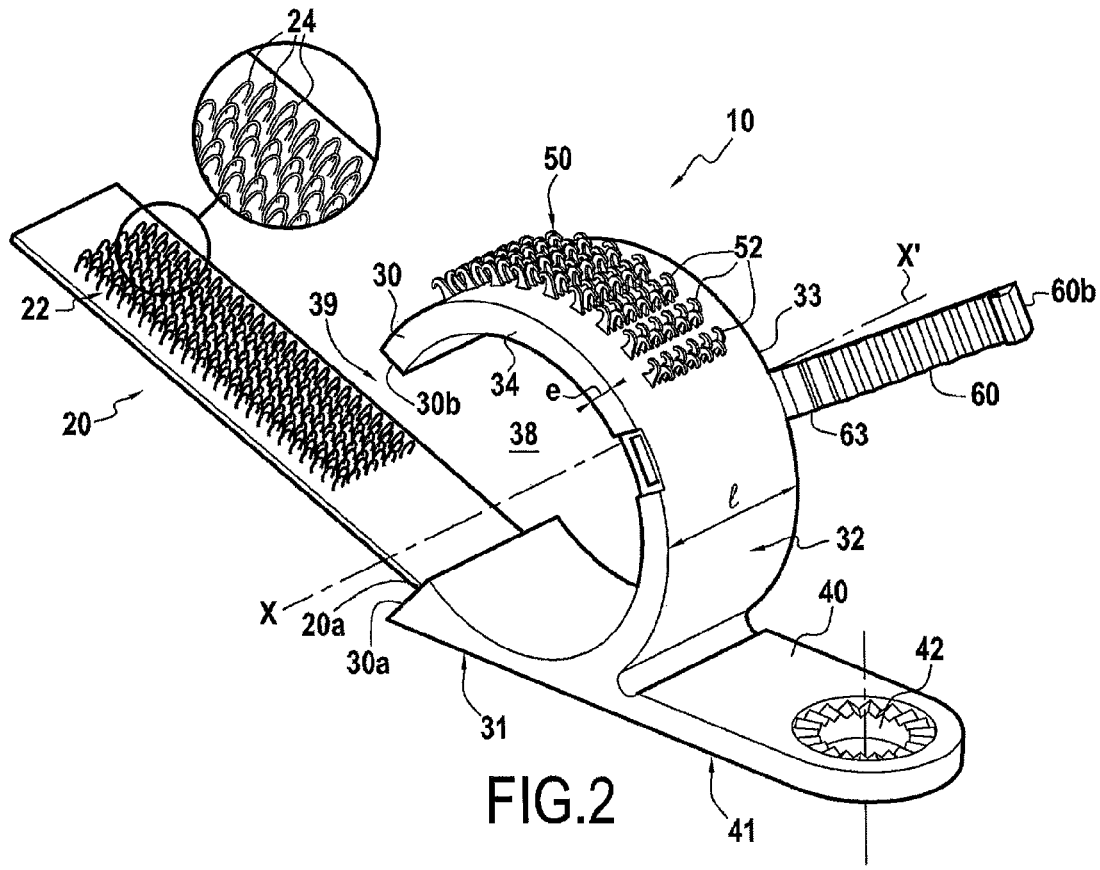
FIG. 2 is a perspective view of an attachment collar in an embodiment of the present invention, prior to assembly.

As shown in FIG. 2, the array 50 of gripping elements provided on the belt portion 30 is an array of hooks 52. Nevertheless, hooks 52 merely constitute a non-limiting example of the present invention, and all of the characteristics described below may apply in the same manner to any other type of gripping element.

The hooks 52 are made by injection molding at the same time as the belt portion 30 is made.

In order to make such a unit as a single piece in a single molding operation, and given the difference in volume of material between the belt portion 30 and the hooks 52, it is preferable to use the installation and the method as described in French patent application No. 08/03707 filed on Jul. 1, 2008 in the name of the Applicant.

In this example, the array 50 of hooks is constituted by a plurality of rows that extend axially. Each row of hooks comprises a succession of single-headed hooks 52 facing to the left and facing to the right.

As shown in FIG. 2, the array 50 of hooks is situated on the side of the belt portion 30 that is remote from its end 30a to which the tape 20 is secured. At this location, the outside profile of the belt portion 30 is curved, being centered on the axis X-X'.

Over a zone starting from the first free end 30a of the belt portion 30 that is furthest from the array 50 of hooks, the outside face 31 of the belt portion 30 is on the contrary substantially plane, so as to be capable of bearing against a plane support 200, as shown in FIGS. 6 and 7.

As shown in FIG. 2, a fastener tab 40 extends from this zone of the belt portion 30, tangentially therethrough, and going away from the end 30a. A face 41 of the fastener tab 40 thus extends the plane outside face 31 of the belt portion 30 and is situated in the same plane.

The fastener tab 40 has a hole 42 for receiving a screw 70 or any other element suitable for co-operating with the support 200.

As shown in FIG. 2, a safety clip 60 projects from a zone of the belt portion 30 situated after the array 50 of hooks, going away from the second free end 30b of the belt portion 30, i.e. between the array 50 of hooks and the fastener tab 40. The zone of the belt portion 30 that carries the safety clip 60 presents a curved outside profile in this example.

Figure 3:
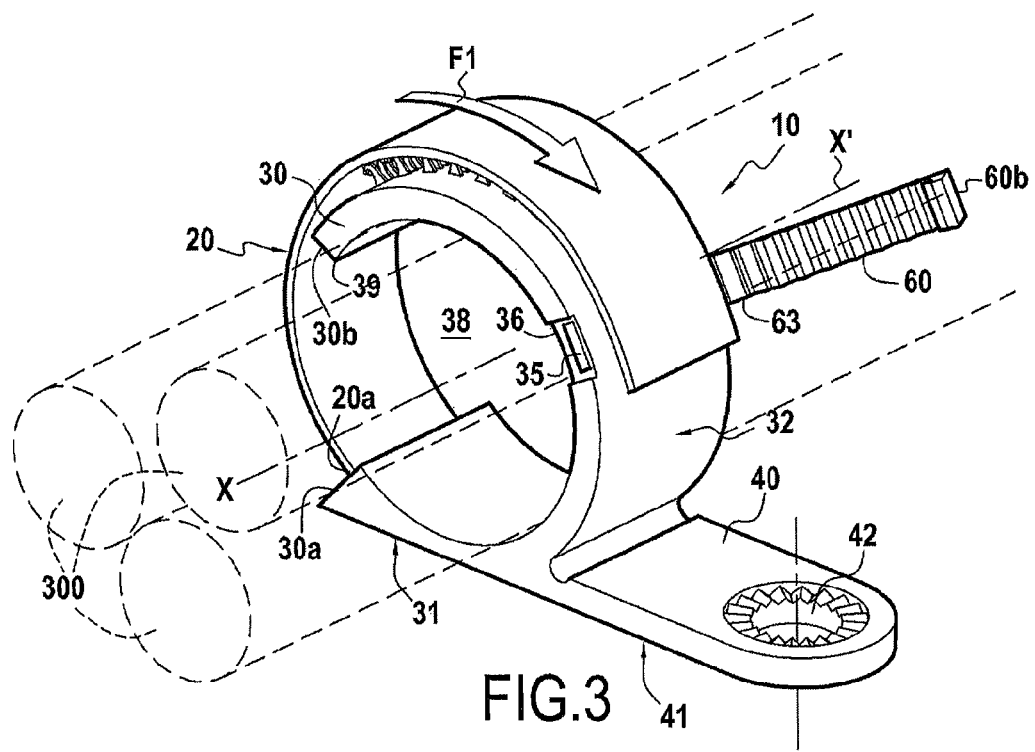
FIG. 3 is a perspective view of the FIG. 2 attachment collar once the cables have been inserted in the inside space of the belt portion and the tape has been displaced on the outside face of the belt portion.
Figure 4:
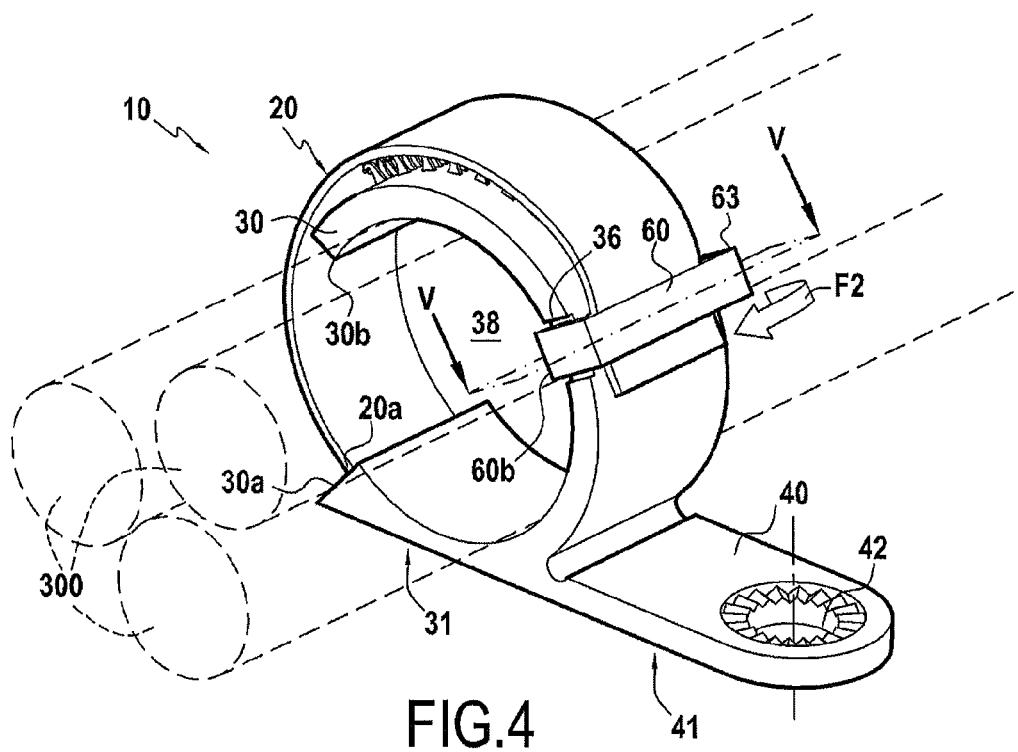
FIG. 4 shows the FIG. 2 collar in which the tape is clamped by the safety clip against the outside face of the belt portion.

This safety clip extends from a first axial edge 33 of the belt portion 30. By means of a hinge 63 or merely by means of folding, the safety clip 60 is suitable for passing from a raised position in which it extends in a direction that is substantially perpendicular to the outside face 22 of the belt portion 30 (as shown in FIGS. 2 and 3), to a displaced position in which its free end 60b is displaced towards the opposite axial edge 34 of the belt portion 30 (as shown in FIG. 4).

Figure 5:
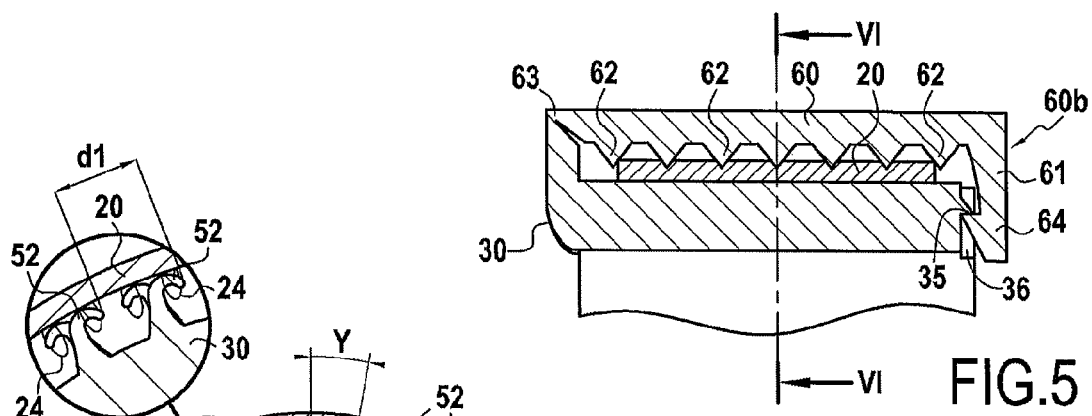
FIG. 5 is a section view on V-V of FIG. 4 showing the safety clip in greater detail.

By way of example, the safety clip 60 may be molded integrally with the belt portion 30. Under such circumstances, and as shown in FIG. 5, the hinge 63 may be formed merely by a narrowing or a constriction of the material.

In a variant embodiment, the safety clip 60 may be sufficiently flexible to be folded into the pressed-down position. Under such circumstances, there is no need to provide a hinge.

In the example described, the safety clip 60 presents a length that is substantially equal to the width l of the belt portion 30 so that in the pressed-down position it covers the belt portion 30 from one axial edge 33 to the other axial edge 34.

Still in the example described, the free end 60b of the safety clip 60 co-operates with the opposite axial edge 34 of the belt portion 30 by clip-fastening. For this purpose, the safety clip 60 includes a tongue 61 at its free end 60b for the purpose of occupying a position facing the opposite axial edge 34 of the belt portion 30 once the safety clip 60 is in the pressed-down position. This tongue 61 is terminated by a tooth 64 facing towards the belt portion 30 and presenting a sloping surface adapted to co-operate with a rib 35 provided on the axial edge 34. When the tongue 61 is engaged against the rib 35 via the chamfered edge of the tooth 64, it flexes a little and then, once the tooth 64 is engaged behind the rib 35, it returns to its initial position. By blocking the tooth 64, the rib 35 then prevents the safety clip 60 from moving away from the outside face 32 of the belt portion 30.

Preferably, and as shown in FIG. 4, the rib 35 is provided in a setback 36 in the axial edge 34 of the belt portion 30, thereby preventing the free end 60b of the safety clip 60, once fastened in position, from sliding tangentially relative to the belt portion 30.

As shown in FIG. 5, the safety clip 60 has a plurality of projecting portions in relief 62 on its face that faces towards the belt portion 30, these portions in relief having a function that is described in greater detail below.

As mentioned above, the tape 20 is secured to the first free end 30a of the belt portion 30 that is situated remote form the hook array 50.

The belt portion 30 is overmolded on the tape 20. As shown in the figures, the width and the thickness of the tape 20 are slightly smaller than the width and the thickness of the belt portion 30 such that the proximal end 20a of the tape 20 is completely embedded in the plastics material of the belt portion 30.

In the example described, the tape 20 is made of woven fabric. It is also provided on its inside face 22, i.e. its face that faces towards the opening 39 in the belt portion 30, with loops 24 that form retention elements that are adapted to co-operate with the hooks 52 of the belt portion 30.

As shown in FIG. 3, after the cables 300 have been inserted into the inside space 38, the tape 20 is displaced against the outside face 32 of the belt portion 30 so as to close the opening 39 (see arrow F1).

The tape 20 is pulled towards the belt portion 30 in such a manner that at least some of the loops 24 are to be found in register with the hook array 50 and can become fastened thereto.

The safety clip 60 is then moved from its raised position as shown in FIG. 3 to its pressed-down position as shown in FIG. 4, and then the tongue 61 is clipped onto the rib 35 of the belt portion 30. In this position, the projecting portions in relief 62 apply pressure spots on the tape 20 against the outside face 32 of the belt portion 30, thereby contributing to holding it in place (see FIG. 5).

The collar 10 is then releasably fastened on a support 200 with the help of a screw 70, as shown in FIG. 6, of a staple as shown in FIG. 7 or 8, of a clip as shown in FIG. 9, or of any other appropriate fastener means.

The staple 71 shown in FIG. 7 is particularly suitable for fastening a collar 10 of the invention to a foam panel made up of agglomerated beads of thermoplastic material. Its Christmas-tree-shaped branches 72 define between them interstices 73 in which one or more beads of the panel can be housed.

The staple 74 shown in FIG. 8 has a portion 75 that is to be clipped in the hole 42 in the fastener tab 40, and a wider base 76 that is provided on its bottom face with hooks 77. This staple 74 is particularly suitable for fastening onto a support 200 of non-woven fabric.

FIG. 9 shows a clip 78 adapted to be inserted in the hole 42 of the fastener tab and then in a hole in a support 200. The clip 78 has a head 79 adapted to bear against the top face of the fastener tab 40, and two arms 80 that project from the bottom face of the head 79, the arms having a pressed V-shape, each having a lug 81 projecting radially outwards. The arms 80 are adapted to bend inwards while the lugs 81 are co-operating with the inside wall of the hole in the support 200, and to redeploy outwards once the lugs 81 have gone beyond said hole, the lugs 81 then constituting means for preventing the clip 78 from moving in translation relative to the support 200.

Preferred dimensions for the collar of the invention are given below.

Advantageously, the belt portion 30 presents at thickness e lying in the range 1.5 millimeters (mm) to 3 mm. The hook array 50 extends over an angular sector z of at least 45°, and over a width lying in the range 6 mm to 10 mm, and in any event greater than half the width of the belt portion 30. The hook array 50 extends in all over an area lying in the range 120 square millimeters ($mm^2$) to 180 $mm^2$. It is made up of a plurality of parallel rows of hooks that extend axially. In general, the number of rows of hooks is selected to lie in the range seven to 15. The distance d1 measured linearly between two similar points of two hooks 52 that are immediately adjacent to each other and that occupy two adjacent rows (see FIG. 6) lies in the range 2 mm to 3 mm. The angular pitch between two adjacent rows of hooks lies in the range 3° to 8°, for example.

In a particularly advantageous embodiment of the invention, the belt portion 30 presents a circularly arcuate shape with an outside radius r=12.05 mm. Its thickness e, i.e. the distance taken in the radial direction between the inside face and the outside face of the belt portion is equal to 2 mm. The hook array 50 extends in all over an angular sector of 90°, i.e. over an arcuate length equal to 18.93 mm, and over a width (taken in the axial direction) equal to 7.98 mm. The total area of the hook array is then equal to 151 $mm^2$. The distance d1 measured linearly between two similar points of two hooks 52 that are immediately adjacent to each other and that occupy two adjacent rows is equal to 2.31 mm. The angular pitch y between two adjacent rows of hooks 52 is equal to 5°. With these arrangements, the total volume of the part comprising the belt portion 30, the safety clip 60, the hook array 50, and the fastener tab 40 is equal to 2800 cubic millimeters ($mm^3$).

The invention claimed is:

1. An attachment collar for elongate elements, the collar comprising a belt portion suitable for being fastened to a support, the belt portion being open and defining an inside space suitable for receiving the elongate element, the collar further comprising means for closing the belt portion so as to retain the elongate elements in the inside space wherein the means for closing the belt portion comprise firstly an array of gripping elements made of plastics material injected integrally with the belt portion and situated on its outside face, and secondly a tape secured to the belt portion via one of its ends, the inside face of the tape presenting retention means suitable for co-operating with the gripping elements of the belt portion in order to secure the tape and the belt portion together, the belt portion presenting stiffness that is greater than the stiffness of the tape.

2. An attachment collar according to claim 1, wherein the belt portion is overmolded onto the tape.

3. An attachment collar according to claim 1, wherein the tape is secured to a free end of the belt portion and the gripping element array covers a portion of the outside face of the belt portion situated beside its other free end.

4. An attachment collar according to claim 1, wherein the tape is made out of fibers.

5. An attachment collar according to claim 4, wherein the tape is made of woven fabric and includes an array of loops forming retention means.

6. An attachment collar according to claim 1, wherein the tape is made of thermoplastic material.

7. An attachment collar according to claim 1, wherein the gripping elements are hooks.

8. An attachment collar according to claim 1, wherein the gripping element array extends over an angular sector of the belt portion of at least 45°.

9. An attachment collar according claim 1, wherein a safety clip extends from a first edge of the belt portion, and said clip is configured so that its free end is suitable for being displaced towards the opposite edge of the belt portion.

10. An attachment collar according to claim 9, wherein the free end of the safety clip is suitable for being clipped onto the opposite edge of the belt portion.

11. An attachment collar according to claim 9, wherein the safety clip, when in the pressed-down position, covers the belt portion across its entire width.

12. An attachment collar according to claim 9, wherein the safety clip includes a plurality of projecting portions in relief on its face directed towards the belt portion.

13. An attachment collar according to claim 1, wherein a fastener tab suitable for co-operating with a fastener element, in particular a screw, extends from the belt portion, substantially tangentially relative thereto.

* * * * *